3,179,136
HAND TOOL ADAPTER
Jean A. De Santis, 10330 Seaton Drive, Bellefontaine Neighbors, Mo.
Filed Apr. 24, 1962, Ser. No. 189,816
5 Claims. (Cl. 144—134)

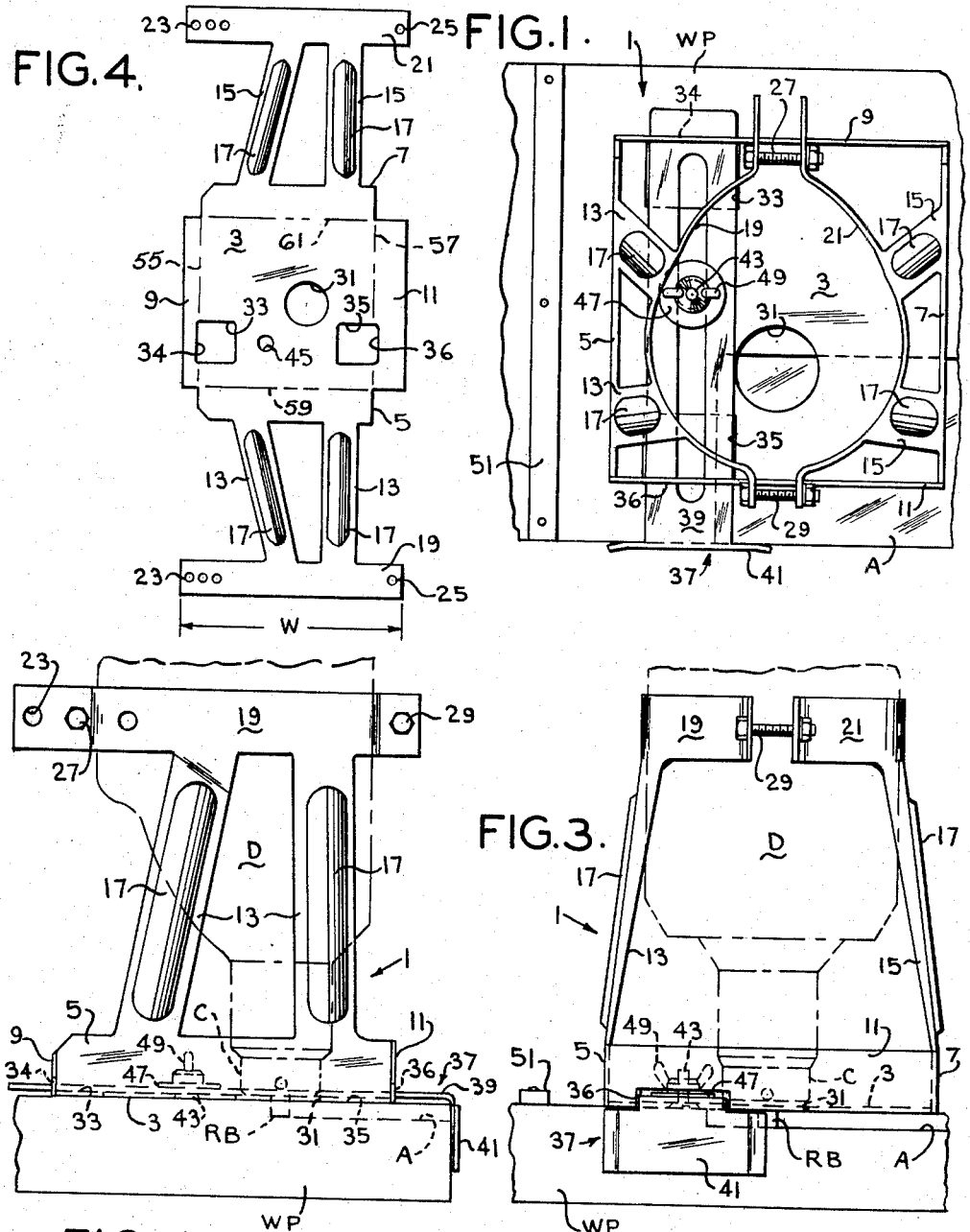

This invention relates to portable hand tool adapters, and more particularly to a mounting for supporting an electric hand drill in a position to function as a router.

Among the several objects of the invention may be noted the provision of a low-cost router mounting for supporting a portable electric power tool, such as an electric hand drill having a router bit in the chuck thereof, in a position for accurately and conveniently routing out recesses, such as hinge recesses in doors or the like; the provision of a router mounting of the class described by the use of which the dimensions of the routing can be accurately controlled; and the provision of a router mounting of this class which is simple to construct by sheet metal forming operations. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan view of the router mounting shown in position on a workpiece;

FIG. 2 is a left side elevation of FIG. 1 with a part of a hand tool being shown in broken lines;

FIG. 3 is a front elevation of FIG. 2; and

FIG. 4 illustrates a preliminarily formed blank from which the router mounting is subsequently completely formed.

Corresponding reference characters indicate corresponding parts throughout the several views of the drawings.

There are various attachments for converting portable electric hand drills of the type commonly found in home work shops, into tools adapted to perform functions other than drilling. Among such attachments are mountings for holding or supporting a hand drill in a position to perform routing but they are costly. By means of the present invention, the simplicity of such mountings is improved and their cost reduced.

Referring now more particularly to FIGS. 1–3 of the drawings, a router mounting generally indicated at numeral 1 is shown as it would appear on a workpiece WP, such as a door, which is to be routed in a predetermined area A to accept a hinge plate, for example. An electric drill D having a router bit RB secured in the drill chuck C is shown in dotted lines in FIGS. 2 and 3 as being clamped in the router mounting 1.

Router mounting 1 includes a flat, rectangular base 3 having vertically disposed sides 5, 7, 9 and 11 bent upwardly from its margins. Two pairs of legs 13 and 15 extend upwardly from sides 5 and 7, respectively. These form supporting columns. Each of these legs or columns is crimped as indicated at 17 for increasing their rigidity.

Two clamping straps 19 and 21 extend from the upper ends of legs 13 and 15 in a direction generally parallel to base 3. Each of the straps 19 and 21 is provided with a plurality of holes 23 at one end thereof and a single hole 25 at the other end thereof. The straps are adapted to surround the motor body of drill D and clamped thereagainst by fasteners, such as bolts 27 and 29. The straps being composed of sheet metal are bendable to conform to various drill body shapes. The bolt 27 may be placed through any of the holes 23 thereby adapting the mounting to fit various sizes of drills D.

Base 3 is provided with an opening 31 in which a router bit RB is located when the drill is clamped in position by straps 19 and 21. Openings 33 and 35 are also provided in the base 3 and portions of flaps 9 and 11. When the sides 9 and 11 are bent upwardly the outer end portions of the openings 33 and 35 oppositely terminate therein. These outer portions of the openings are numbered 34 and 36 respectively. An adjustable gauge bar 37 has a slotted arm 39 which extends through the portions of openings 33 and 35 in sides 9 and 11 and is slidably mounted on base 3. At the end of the arm 39 is a right-angularly bent lip which is wider than the arm 39. A beveled flat-head screw 43 extends upwardly through a beveled hole 45 in the base 3 and through the slot in arm 39. A washer 47 overlies the arm 39 and a wing nut 49 applied to the screw 43 is adapted to be screwed down to clamp the arm in a selected position. The lip 41 is adapted to engage the side of workpiece WP for guiding and limiting the movements of mounting 1. The gauge arm 39 may be reversed in position in the openings 34 and 36 so that lip 41 can be adjusted from one side or another of the device. In either case the lip is movable not only out beyond the adjacent side 9 or 11 (as the case may be) but is movable to positions under bottom 3 within the confines of said sides 9 and 11, if desired.

In order to rout out area A of workpiece WP the router bit RB is first placed in chuck C. Then straps 19 and 21 are placed generally around the body of drill D. Fasteners 27 and 29 are next tightened to pull the ends of the straps toward one another and clamp the drill body. As the bolts 27 and 29 are tightened, the straps may be somewhat deformed to conform to the shape of the drill body. The gauge member 37 is adjusted to a position wherein, with lip 41 in engagement with the side of workpiece WP, the router bit RB will be spaced from the side of workpiece WP by a distance equal to the desired width of the routing A. Strips of wood, or right angle stops of wood or steel, one of which is indicated at 51, may be tacked or clamped to the workpiece WP to provide the limits for the length of routing A. The drill may then be energized and the device moved between the limits established by the stops 51 and the limit established by engagement of the lip 41 with the side of the workpiece WP. The result is the routing out of a rectangular area lettered A. The routing may thus be performed easily and accurately by virtue of the rigid mounting and the gauge bar 37 by stops 51.

One of the advantages of this router mounting is the simple but effective manner in which it is constructed. As will be seen by referring to FIG. 4, the base 3, sides 5, 7, 9 and 11, legs 13 and 15, and clamping straps 19 and 21 may be blanked from deformable sheet metal of 19 gauge, for example. The sheet metal may be in strip form of width W, making it convenient to feed through a press without waste. The crimping 17 may also be simultaneously formed during the blanking operation, a single set of dies being sufficient. In this regard it will be noted that the ends of straps 19 and 21 are aligned with the outer edges of sides 9 and 11. These ends and outer edges lie in the edges of the strip of width W from which the blank is pressed. This not only minimizes waste but also reduces the cost of the die and reduces the pressure with which it must be applied. The holes 23 and 25, the openings 31, 33 and 35, and the hole 45 are introduced during the stamping operation. Next, the sides 9 and 11 are bent upwardly on lines 55 and 57 and the sides 5 and 7, legs 13 and 15 and straps 19 and 21 are bent upwardly on lines 59 and 61. The bevel of hole 45 may be coined at this time. The sides 5, 7, 9 and 11 form stiffening ribs for the flat bottom 3. After the above mentioned parts are formed the clamping straps 19 and 21 are formed in general semicircular or C-shaped configurations. Final bending of the straps 19 and 21 may be left to the purchaser, who will bend such straps to fit his particular drill body. The adjustable guide 37 is also stamped, after which the lip 41 may be bent perpendicular to arm 39.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A router mounting for a portable tool of the type having a chuck for holding a router bit, comprising a base having an opening through which said bit is adapted to pass, first and second pairs of legs bent upwardly on opposite sides of said base, a first clamping strap extending generally parallel to said base and extending between and beyond the upper ends of said first pair of legs, and a second clamping strap extending generally parallel to said base and extending between and beyond the upper ends of said second pair of legs, said straps adapted to be bent around and clamped to said tool to hold the tool in a position wherein said bit passes through the opening in said base, said base, legs and straps being formed from a single sheet of metal.

2. A router mounting as set forth in claim 1 further comprising a gauge bar adjustably connected to said base for limiting the movement of said mounting in one direction, said gauge bar comprising an arm adapted to slide on said base and extending beyond said base on one side of the latter, a lip extending downwardly below said base from the extended end of said arm, and means for locking said arm to said base.

3. A router mounting for a portable tool of the type having a chuck adapted to hold a router bit, comprising a flat rectangular base, first and second pairs of legs bent upwardly on opposite sides of said base, said legs being crimped, first and second clamping straps extending parallel to said base from the upper ends of the respective pair of legs, said straps being adapted to be bent around and clamped to said tool, said base, legs and straps being integrally connected to one another and formed from a single sheet of metal, said base having an opening therein through which said bit is adapted to pass, a gauge bar for limiting the movement of said mounting in one direction comprising an arm slidably mounted on the upper surface of said base and extending beyond said base on one side of the latter, a lip extending downwardly below said base, said arm having a slot therein, a screw extending upwardly from said base through said slot, and a nut on the upwardly extending end of said screw adapted to be tightened downwardly to hold said arm in a selected position.

4. A sheet-metal adapter for converting an electric hand drill for routing; comprising a flat base having four bent-up integral marginal ribs, from opposite margins of one pair of which are integral upwardly extending legs crimped for rigidity, and integral transverse C-shaped strap extending from each pair of legs and integral therewith, said straps adapted to be clamped to the body of the drill, said base having an opening therein for accepting the router carried by the drill, said base also having opposed openings adjacent the other pair of ribs and extending into the same respectively, a slotted gauge bar adapted to pass through the parts of said openings which are in their respective ribs, said gauge bar having a bent lip of width greater than that of the bar and adapted to move under said base, said base having an additional opening registering with the slot, and a clamp screw extending through the last-named opening and said slot.

5. A sheet-metal adapter for converting an electric hand drill for routing; comprising a substantially flat base having four bent-up integral marginal ribs, from opposite margins of one pair of which are integral upwardly extending legs crimped for rigidity, an integral transverse clamping strap extending from each pair of legs and integral therewith, said base having an opening therein for accepting the router carried by the drill, said base also having opposed openings adjacent the other pair of ribs and extending into the same respectively, a slotted gauge bar adapted to pass through the parts of said openings which are in their respective ribs, said base having an additional opening registering with the slot, and a clamp screw extending through the last-named opening and said slot.

References Cited by the Examiner

UNITED STATES PATENTS

| | | | |
|---|---|---|---|
| 2,189,246 | 2/40 | Henry. | |
| 2,888,965 | 6/59 | Phillips | 144—136 X |
| 3,065,654 | 11/62 | Critelli et al. | 144—136 |
| 3,087,520 | 4/63 | Fielder | 144—136 |

LESTER M. SWINGLE, *Primary Examiner.*

EARL EMSHWILLER, WILLIAM W. DWYER, Jr.,
*Examiners.*